(12) United States Patent
Wade et al.

(10) Patent No.: US 8,825,936 B2
(45) Date of Patent: Sep. 2, 2014

(54) SYSTEMS AND METHODS FOR INCREASING DATA VOLUME SPARSENESS

(75) Inventors: Gregory L. Wade, San Jose, CA (US); J. Mitchell Haile, Somerville, MA (US)

(73) Assignee: Quantum Corporation, San Jose, CA (US)

(*) Notice: Subject to any disclaimer, the term of this patent is extended or adjusted under 35 U.S.C. 154(b) by 768 days.

(21) Appl. No.: 12/618,902

(22) Filed: Nov. 16, 2009

(65) Prior Publication Data

US 2011/0029713 A1 Feb. 3, 2011

Related U.S. Application Data

(60) Provisional application No. 61/230,872, filed on Aug. 3, 2009.

(51) Int. Cl.
*G06F 12/00* (2006.01)
*G06F 3/06* (2006.01)

(52) U.S. Cl.
CPC ............ *G06F 3/0608* (2013.01); *G06F 3/0664* (2013.01); *G06F 3/0689* (2013.01); *G06F 3/0641* (2013.01)
USPC ........ 711/6; 711/162; 711/170; 711/E12.001; 711/E12.002; 711/E12.103

(58) Field of Classification Search
USPC .............. 711/6, 162, 170, E12.001, E12.002, 711/E12.016, E12.103
See application file for complete search history.

(56) References Cited

U.S. PATENT DOCUMENTS

| | | | |
|---|---|---|---|
| 7,447,854 B1 | 11/2008 | Cannon | |
| 7,743,028 B1 | 6/2010 | Stringham et al. | |
| 7,882,386 B1* | 2/2011 | Potnis et al. | 714/2 |
| 8,010,495 B1* | 8/2011 | Kuznetzov et al. | 707/649 |
| 8,200,637 B1* | 6/2012 | Stringham | 707/670 |
| 8,316,196 B1* | 11/2012 | Mullis et al. | 711/162 |
| 2004/0167923 A1* | 8/2004 | Carr. | 707/102 |
| 2005/0055529 A1* | 3/2005 | Lubbers et al. | 711/203 |
| 2009/0252111 A1* | 10/2009 | Liu et al. | 370/330 |
| 2010/0011178 A1 | 1/2010 | Feathergill | |
| 2010/0125598 A1* | 5/2010 | Lango et al. | 707/769 |
| 2010/0169382 A1* | 7/2010 | Sheaffer et al. | 707/802 |
| 2010/0318498 A1* | 12/2010 | Swarnakar | 707/693 |

* cited by examiner

*Primary Examiner* — Mardochee Chery

(57) ABSTRACT

Disclosed is a method of operating a data storage system. The method comprises generating first metadata describing storage of a volume of data in a first storage volume, storing the volume of data within a second storage volume, generating second metadata describing storage of the volume of data in the second storage volume, and processing the first metadata and the second metadata to increase sparseness of the volume of data stored in the second storage volume.

15 Claims, 11 Drawing Sheets

SYSTEMS AND METHODS FOR INCREASING DATA VOLUME SPARSENESS

RELATED APPLICATIONS

This application is related to and claims priority to U.S. Provisional Patent Application No. 61/230,872, entitled "A Method for Making a Live Virtual Disk File Sparse Using File System Metadata and Copy-On-Write Snapshots," filed on Aug. 3, 2009, and which is hereby incorporated by reference in its entirety.

TECHNICAL BACKGROUND

In the field of computer hardware and software technology, a virtual machine is a software implementation of a machine (computer) that executes program instructions like a real machine. Virtual machine technology allows for the sharing of, between multiple virtual machines, the physical resources underlying the virtual machines.

In virtual machine environments, a storage volume may be presented as containing a greater amount of data than an underlying storage volume that stores the data. For example, a virtual disk drive in a virtual machine environment may be presented to a user as containing 20 GB of data. However, the virtual disk file underlying the virtual disk drive may contain only 5 GB of actual data. Indeed, such an underlying storage volume may be considered a sparse storage volume.

To create sparseness, a primary storage volume is examined for strings of zeroes within a region. Because of the string of zeroes, the region can potentially be made sparse. To do so, metadata is written to the underlying storage volume that describes an empty block in the primary storage volume that has been allocated, rather than writing the entire empty block to the underlying storage volume. Over time, the underlying storage volume may become less sparse. However, the metadata that describes the storage of the data volume within the underlying storage volume can be analyzed to increase the sparseness of the underlying storage volume.

Unfortunately, this process can be very resource intensive, reducing the performance of a virtual machine and other operations within a virtual machine environment.

Overview

Disclosed are data storage systems and methods of operating data storage systems. In an embodiment, a method comprises generating first metadata describing storage of a volume of data in a first storage volume, storing the volume of data within a second storage volume, generating second metadata describing storage of the volume of data in the second storage volume, and processing the first metadata and the second metadata to increase sparseness of the volume of data stored in the second storage volume.

In an embodiment, the first storage volume comprises a virtual storage device, wherein the second storage volume comprises a virtual disk file corresponding to the virtual storage device, wherein the first metadata comprises a block bitmap for the virtual storage device, and wherein the second metadata comprises a block mapping table for the virtual disk file. The method may further comprise storing the virtual disk file on a physical storage device and storing the block bitmap in the virtual disk file.

In an embodiment, the data storage system comprises a processing system coupled to the physical storage device, a host operating system stored on the physical storage device and executable by the processing system, a hypervisor executed by the processing system and configured to provide an interface between the host operating system and a virtual machine, wherein the virtual machine comprises virtual hardware, a guest operating system and a guest application. Generating the volume of data may comprise executing the guest application to generate the volume of data. Generating the first metadata may comprise executing the guest operating system to generate the block bitmap. Generating the second metadata may comprise executing the hypervisor to generate the block mapping table.

In an embodiment, increasing the sparseness of the volume of data stored in the second storage volume using the first metadata and the second metadata comprises, in the hypervisor, creating a copy of the block mapping table, resulting in a new block mapping table, creating a copy of the volume of data from the virtual disk file, resulting in a new virtual disk file by, for each block identified in the block mapping table, if a corresponding block in the block bitmap is allocated, then copying the data in the block to the new virtual disk file and identifying the block as allocated in the new block mapping table, and, if the corresponding block in the block bitmap is not allocated, then identifying the block as unallocated in the new block mapping table. Increasing the sparseness may also include, in the physical storage device, replacing the virtual disk file with the new virtual disk file, and in the hypervisor, replacing the block mapping table with the new block mapping table.

In an embodiment, the first storage volume comprises a partitioned portion of a physical storage device, wherein the second storage volume comprises a virtual disk file corresponding to the partitioned portion, wherein the first metadata comprises a file access table for at least the partitioned portion, and wherein the second metadata comprises a block mapping table for the virtual disk file, wherein the method further comprises storing the virtual disk file on the physical storage device.

In an embodiment, processing the first metadata and the second metadata to increase the sparseness of the volume of data stored in the second storage volume comprises transforming the second storage volume from a non-sparse state to a sparse state.

In an embodiment, processing the first metadata and the second metadata to increase the sparseness of the volume of data stored in the second storage volume comprises transforming the second storage volume from a sparse state to a more-sparse state relative to the sparseness of the sparse state.

In an embodiment, a data storage system comprises a processing system configured to generate first metadata describing storage of a volume of data in a first storage volume, generate second metadata describing storage of the volume of data in a second storage volume, and process the first metadata and the second metadata to increase sparseness of the volume of data stored in the second storage volume. The data storage system further comprises a physical storage device coupled to the processing system and configured to store the second storage volume, wherein the second storage volume stores the volume of data.

DETAILED DESCRIPTION

Figure 1:
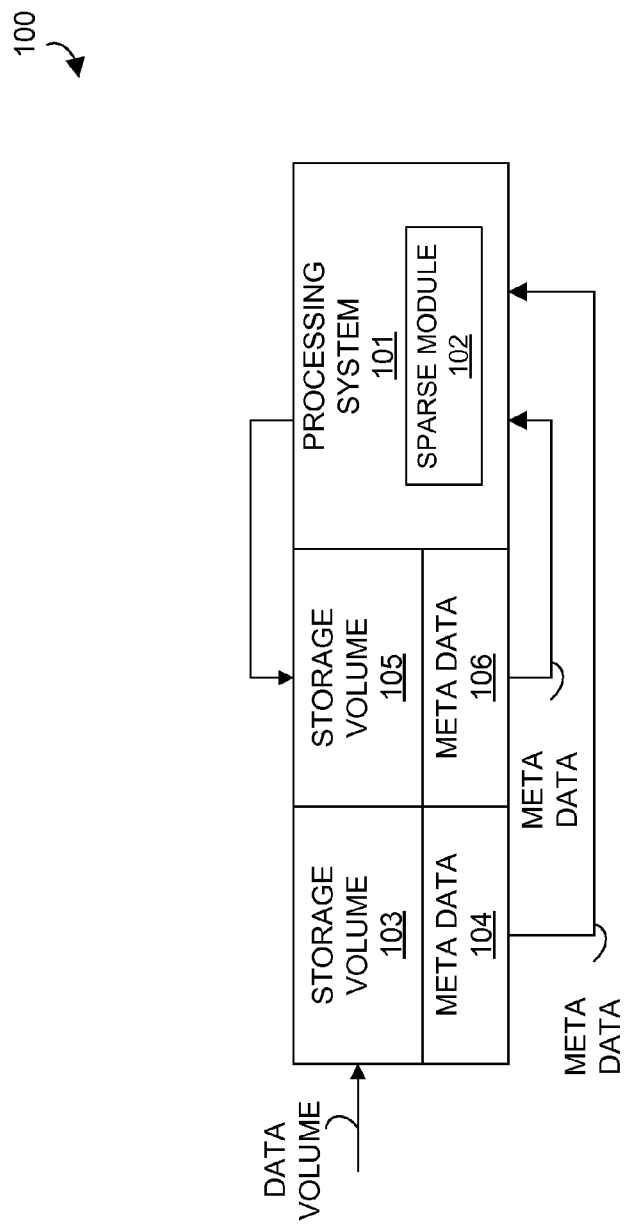
FIG. 1 illustrates a data storage system in an embodiment.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In virtual machine environments, a storage volume may be presented as containing a greater amount of data than an underlying storage volume that stores the data. However, by employing sparseness, the actual storage volume underlying the virtual disk drive may be smaller than the apparent size of the virtual disk drive. While it is possible to maintain sparseness by analyzing the metadata that describes the storage of a data volume within an underlying storage volume, such a process can be costly and inefficient.

Rather, an improved technique involves utilizing both the metadata that describes the storage of a volume of data in the virtual storage volume and the metadata that describes the storage of the data volume within the underlying storage volume to increase the sparseness of the data volume in the underlying storage volume.

In an example, a guest operating system may be executed within a virtual machine that contains a virtual disk drive. The guest operating system may present the virtual disk drive to a user as containing a volume of data using an apparent amount of storage space. It should be understood that the user may be a human operator, as well as other software applications, hardware elements, or the like. Thus, a user may perceive that a real disk drive has stored on it the volume of data occupying that amount of storage space.

The guest operating system may include a file system that generates virtual metadata describing the storage of the volume of data. For example, the file system may generate a file table that describes the storage of the data volume on the virtual disk drive. In some cases, this may be referred to as a file access table Likewise, the virtual machine may include a virtual disk file within which the data volume is actually stored. Corresponding file metadata may describe the storage of the data volume within the virtual disk file. It should be understood that the file meta data could be stored separately from the virtual disk file, but could also be embedded within the virtual disk file. Other implementations are possible.

To increase the sparseness of the virtual disk file, both the virtual metadata and the file metadata can be utilized. For instance, the virtual metadata may be analyzed to identify allocated or unallocated blocks of the virtual disk drive. This information can then be used with the file metadata to identify regions in the virtual disk file that could be made sparse.

Referring now to FIG. 1, data storage system 100 is illustrated in an embodiment whereby metadata that describes the storage of a volume of data in a storage volume and metadata that describes the storage of the data volume within an underlying storage volume is used to increase the sparseness of the data volume in the underlying storage volume. Data storage system 100 includes processing system 101, sparse module 102, storage volume 103, metadata 104, storage volume 105, and metadata 106.

Processing system 101 comprises any system or collection of systems capable of executing sparse module 102 to receive and process metadata to increase sparseness of a storage volume. Processing system 101 may be a micro-processor, an application specific integrated circuit, a general purpose computer, a server computer, or any combination or variation thereof. Sparse module 102 may be program instructions executable by processing system 101.

Storage volumes 103 and 105 may be any storage volumes capable of storing a volume of data. Metadata 104 comprises data that describes the storage of a volume of data in storage volume 103. Likewise, metadata 106 comprises data that describes the storage of a data volume in storage volume 105.

In an example, storage volume 103 may be a virtual storage volume. In this case, metadata 104 may describe the virtual storage of a data volume in storage volume 103. The data volume may itself be stored within another storage volume, such as storage volume 105. Metadata 106 may then describe the storage of the data volume in storage volume 105.

In another example, storage volume 103 may be a non-virtual storage volume. In this case, the volume of data may be stored in storage volume 103, while simultaneously also stored in another storage volume, such as storage volume 105. In this case, metadata 104 may describe the storage of a data volume in storage volume 103, while metadata 106 may describe the storage of the data volume in storage volume 105.

Figure 2:
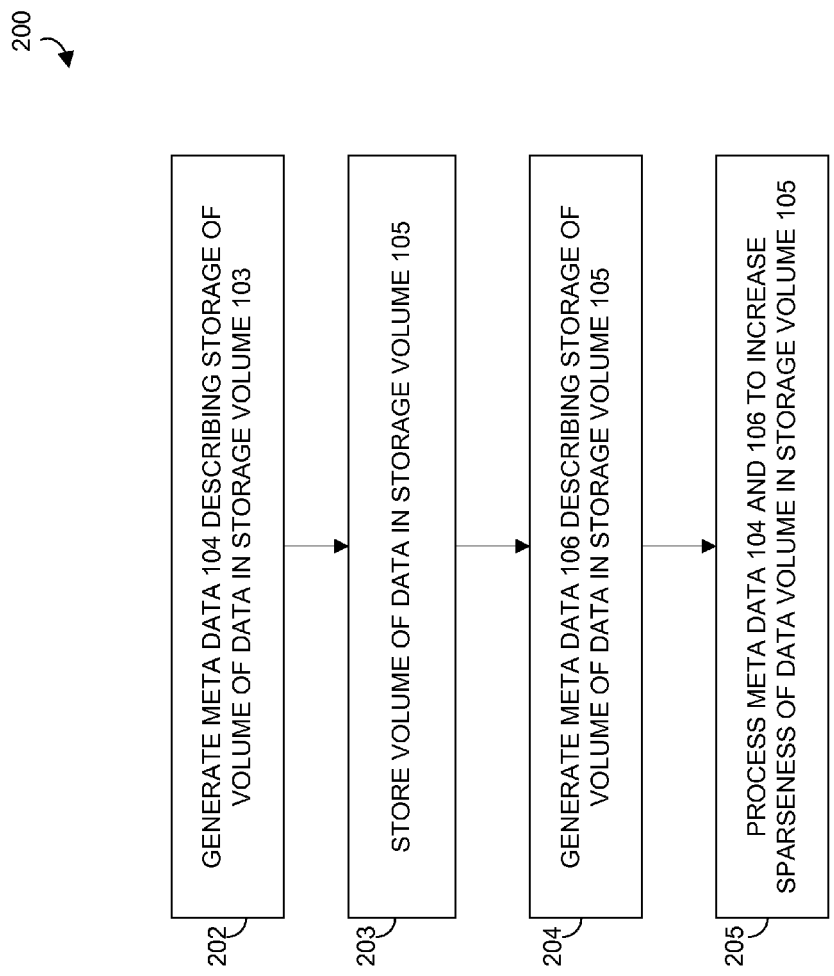
FIG. 2 illustrates the operation of a data storage system in an embodiment.

FIG. 2 illustrates process 200 describing the operation of data storage system 100. To begin, a volume of data is generated and stored. Processing system 101 generates metadata 104 describing the storage of the data volume in storage volume 103 (Step 202). Processing system 101 also stores the data volume in storage volume 105 (Step 203) and generates metadata 106 describing the storage of the data volume in storage volume 105 (Step 204). Lastly, processing system 101, executing sparse module 102, processes metadata 104 and metadata 106 to increase the sparseness of the data volume stored in storage volume 105 (Step 205).

Figure 3:
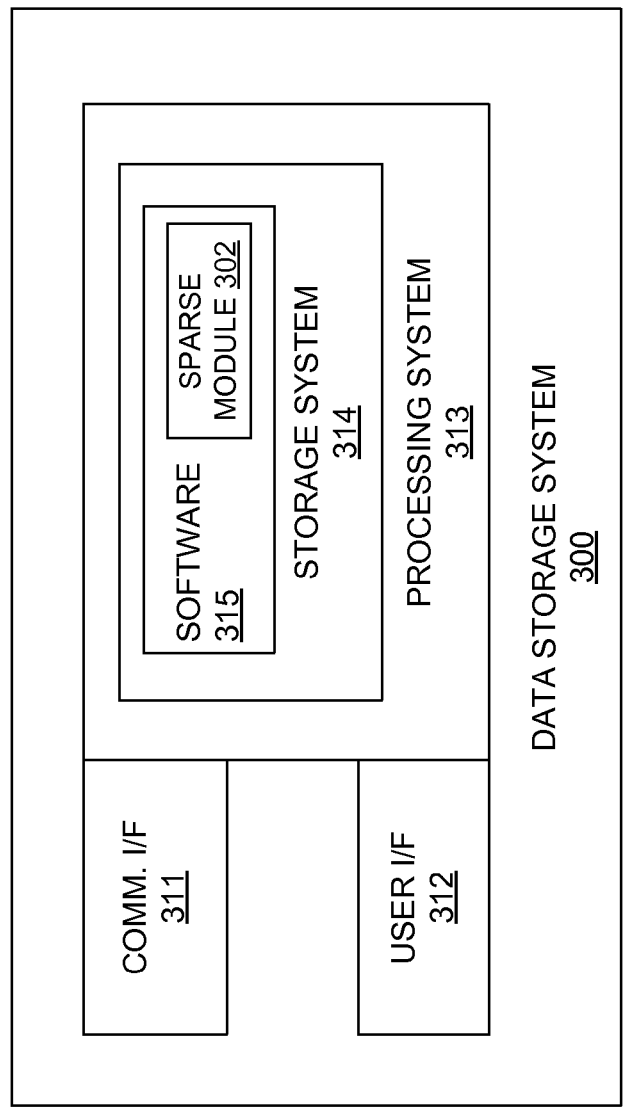
FIG. 3 illustrates a data storage system in an embodiment.

FIG. 3 illustrates data storage system 300 in another embodiment. Data storage system 300 includes communication interface 311, user interface 312, processing system 313, storage system 314, and software 315. Software 315 includes sparse module 302. Processing system 313 is linked to communication interface 311 and 312. Software 315 is stored on storage system 314. In operation, processing system 313 executes software 315, including sparse module 302.

Communication interface 311 comprises a network card, network interface, port, or interface circuitry that allows data storage system 300 to communicate with a storage volume. Communication interface 311 may also include a memory device, software, processing circuitry, or some other communication device. Communication interface 311 may use various protocols, such as host bus adapters (HBA), SCSI, SATA, Fibre Channel, iSCI, WiFi, Ethernet, TCP/IP, or the like to communicate with a storage volume.

User interface 312 comprises components that interact with a user to receive user inputs and to present media and/or information. User interface 312 may include a speaker, microphone, buttons, lights, display screen, mouse, keyboard, or some other user input/output apparatus—including combinations thereof. User interface 312 may be omitted in some examples.

Processing system 313 may comprise a microprocessor and other circuitry that retrieves and executes software 315, including sparse module 302, from storage system 314. Storage system 314 comprises a disk drive, flash drive, data storage circuitry, or some other memory apparatus. Processing system 313 is typically mounted on a circuit board that may also hold storage system 314 and portions of communication interface 311 and user interface 314.

Software 315 comprises computer programs, firmware, or some other form of machine-readable processing instructions. Software 315 may include an operating system, utilities, drivers, network interfaces, applications, virtual machines, or some other type of software. When executed by processing system 313, software 315 directs processing system 313 to operate data storage system 300 as described herein.

Figure 4:
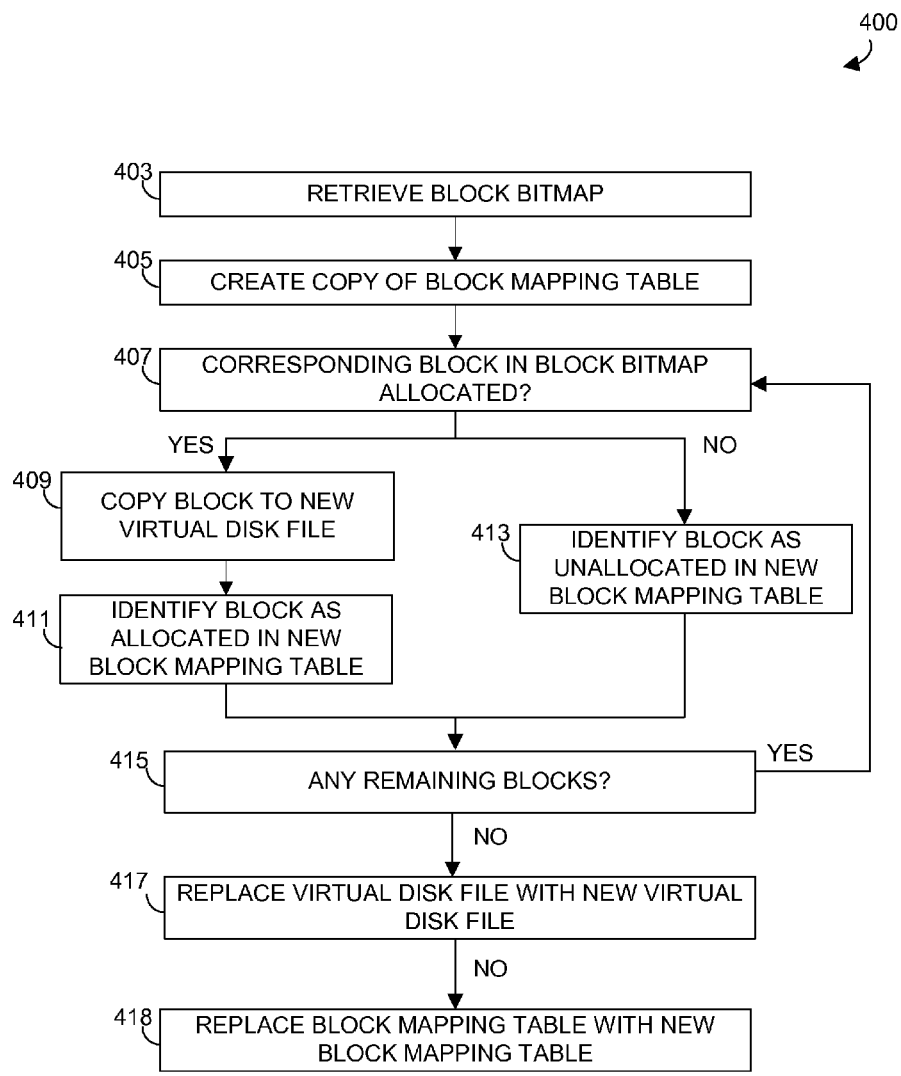
FIG. 4 illustrates the operation of a data storage system in an embodiment.

FIG. 4 illustrates the operation of data storage system 300 when executing sparse module 302. Sparse module 302 uses metadata that describes the storage of a volume of data in a storage volume and metadata that describes the storage of the data volume within an underlying storage volume to increase the sparseness of the data volume in the underlying storage volume.

To begin, a block bitmap is retrieved (Step 403). The block bitmap describes the storage of a data volume in a storage volume. Next, a copy of a block mapping table is created (Step 405). The block mapping table describes the storage of the data volume in another storage volume, such as a virtual disk file.

After obtaining the block bitmap, each block in the block mapping table is analyzed to determine if a corresponding block in the block bitmap is allocated (Step 407). If the corresponding block is allocated, then the contents in the corresponding block are copied to a new virtual disk file (Step 409) and a new block mapping table for the new virtual disk file is updated accordingly to indicate that the subject block is allocated (Step 411). If the corresponding block is not allocated, then the new block mapping table is updated accordingly to indicate that the subject block is not allocated (Step 413).

Steps 407-413 are performed for any remaining blocks (Step 415). If no blocks remain, then the initial virtual disk file is replaced with the new virtual disk file (Step 417). Lastly, the initial block mapping table is replaced with the new block mapping table (Step 418).

Figure 5:
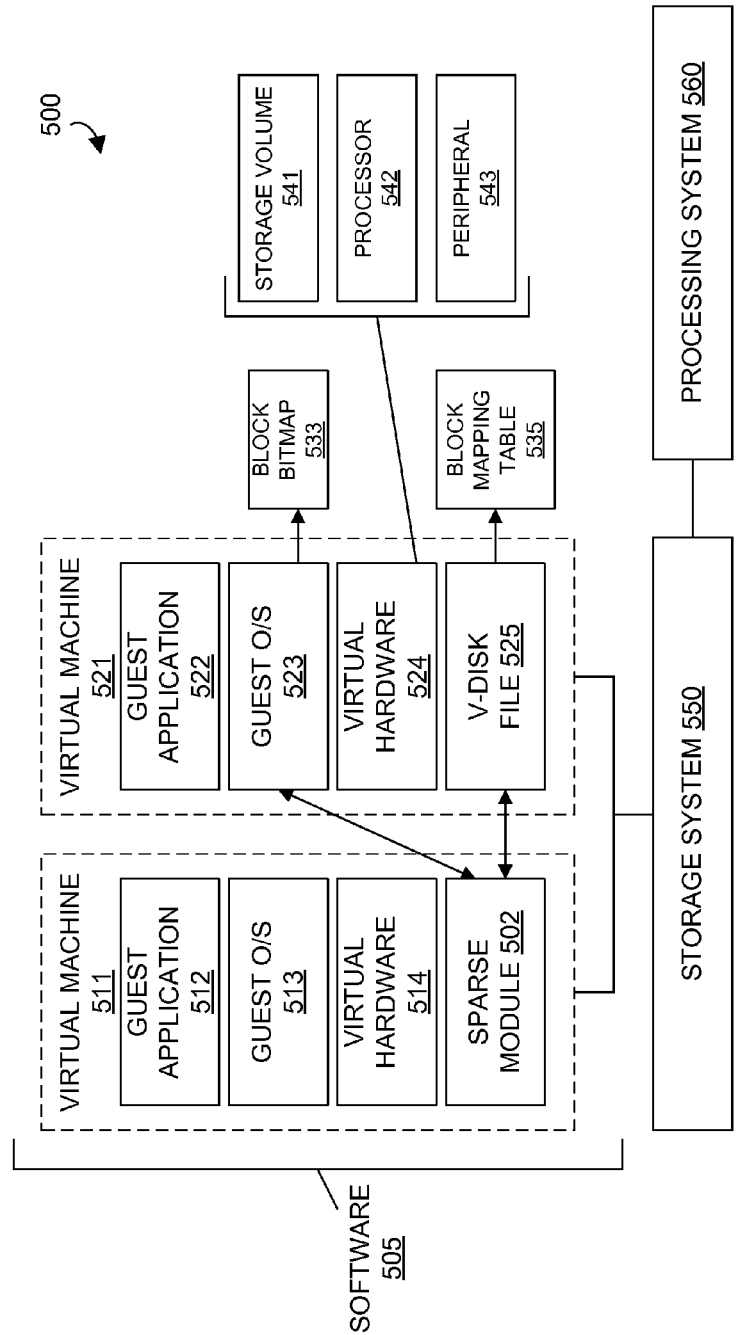
FIG. 5 illustrates a data storage system wherein a sparse module in a virtual machine operates to increase the sparseness of a storage volume in another virtual machine.

FIG. 5 illustrates data storage system 500 in another embodiment. In this environment, data storage system 500 includes processing system 560, storage system 550, and software 505. Software 505 is stored on storage system 500. Processing system 560 executes software 505 to increase the sparseness of a data volume.

Software 505 includes virtual machine 511 and virtual machine 521. Virtual machine 511 includes guest application 512, guest operating system 513, virtual hardware 514, and sparse module 502. Virtual machine 521 includes guest application 522, guest operating system 523, virtual hardware 524, and virtual disk file 525. Virtual hardware 524 includes virtual storage volume 541, virtual processor 542, and virtual peripheral 543. While not shown, virtual hardware 514 may include similar elements as virtual hardware 524.

Guest operating system 523 generates block bitmap 533. Block bitmap 533 describes the storage of a data volume in storage volume 541. Block mapping table 535 describes the storage of the data volume in virtual disk file 525.

In operation, sparse module 502 is executed by processing system 560 to increase the sparseness of the data volume stored in virtual disk file 525, using block bitmap 533 and block mapping table 535.

To begin, sparse module 502 creates a new copy of block mapping table 535 and a new copy of virtual disk file 525. Sparse module 502 retrieves block bitmap 533 and, for each block in block mapping table 535, determines if the corresponding block in block bitmap 533 is allocated or unallocated. If the corresponding block is allocated, then the contents in the corresponding block are copied to the new virtual disk file and the new block mapping table for the new virtual disk file is updated accordingly to indicate that the subject block is allocated. If the corresponding block is not allocated, then the new block mapping table is updated accordingly to indicate that the subject block is not allocated. Upon processing each block, the original virtual disk file is replaced with the new virtual disk file. Likewise, the original block mapping table is replaced with the new block mapping table.

Figure 6:
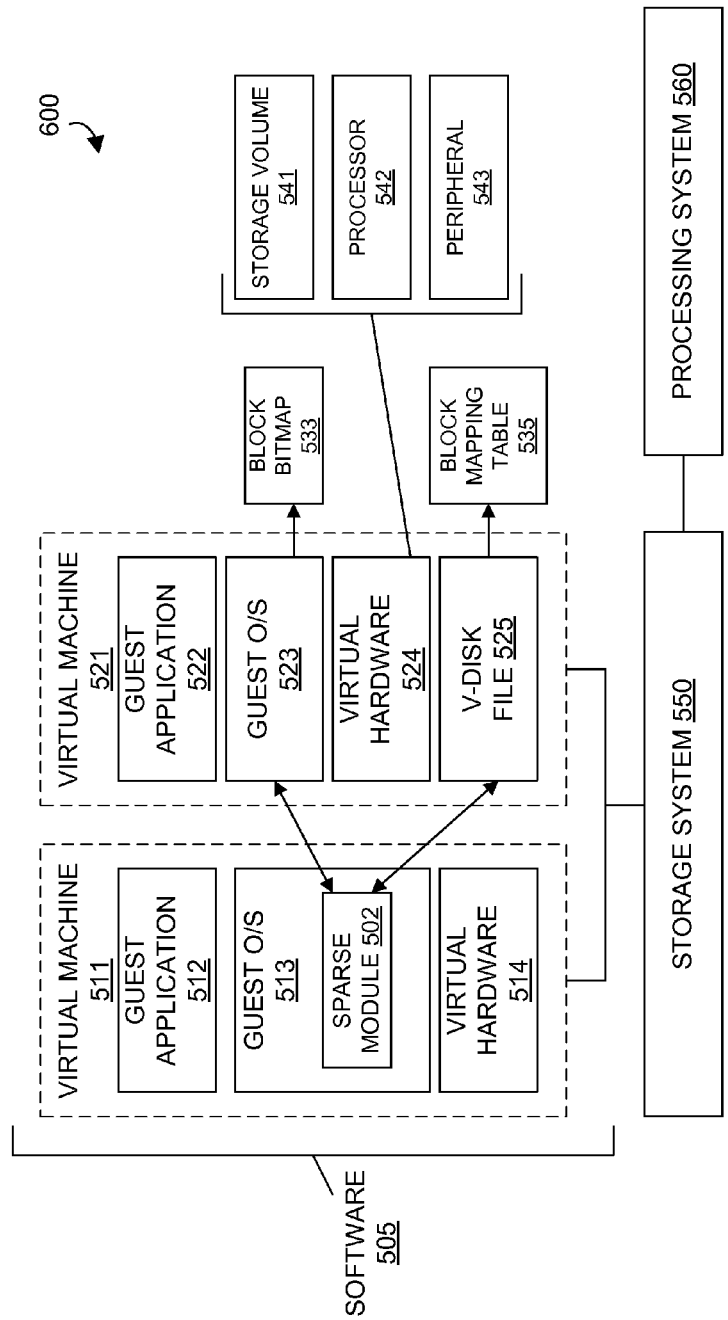
FIG. 6 illustrates a data storage system wherein a sparse module in guest operating system within a virtual machine operates to increase the sparseness of a storage volume in another virtual machine.

FIG. 6 illustrates data storage system 600 in another embodiment. Data storage system 600 is similar to data storage system 500, shown in FIG. 5, except that spare module 502 is within guest operating system 513. In this embodiment, sparse module 502 comprises program instructions executable within an operating system environment, such as guest operating system 513.

In operation, sparse module 502 is executed by processing system 560 within guest operating system 513 to increase the sparseness of the data volume stored in virtual disk file 525, using block bitmap 533 and block mapping table 535.

In particular, sparse module 502 creates a new copy of block mapping table 535 and a new copy of virtual disk file 525. Sparse module 502 retrieves block bitmap 533 and, for each block in block mapping table 535, determines if the corresponding block in block bitmap 533 is allocated or unallocated. If the corresponding block is allocated, then the contents in the corresponding block are copied to the new virtual disk file and the new block mapping table for the new virtual disk file is updated accordingly to indicate that the subject block is allocated. If the corresponding block is not allocated, then the new block mapping table is updated accordingly to indicate that the subject block is not allocated. Upon processing each block, the original virtual disk file is replaced with the new virtual disk file. Likewise, the original block mapping table is replaced with the new block mapping table.

Figure 7:
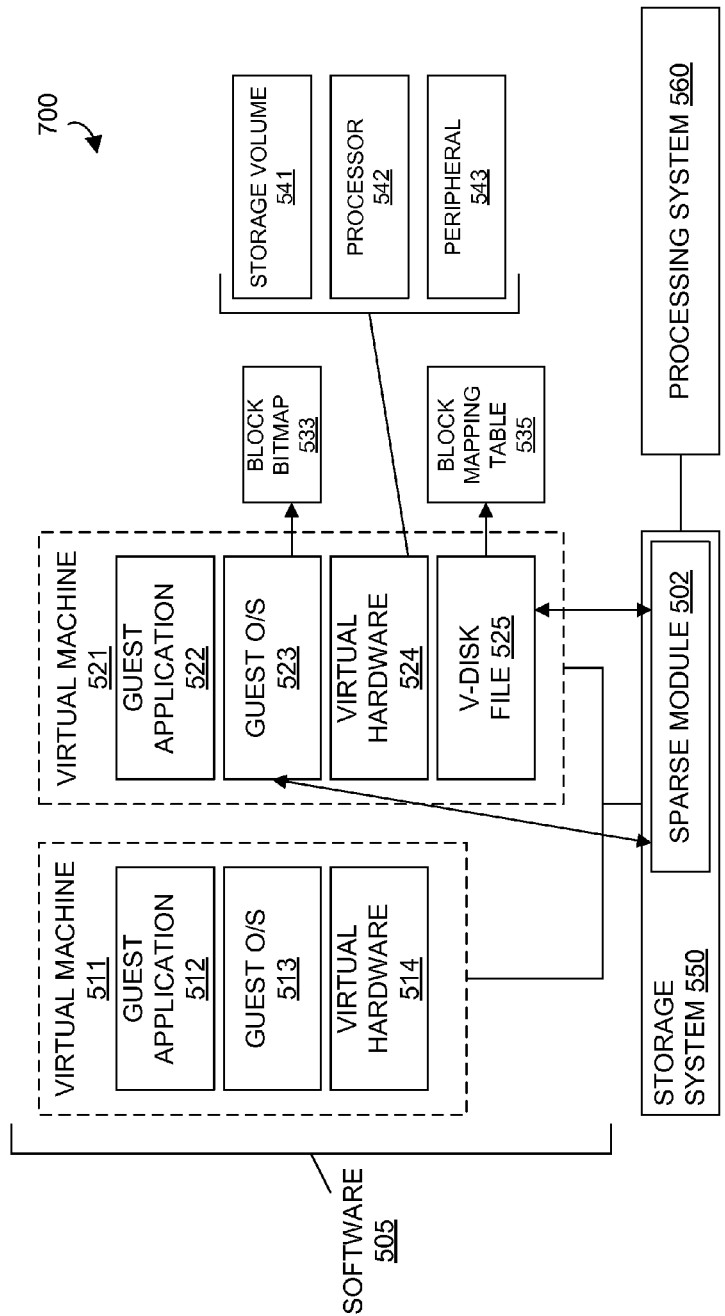
FIG. 7 illustrates a data storage system wherein a sparse module in a storage system operates to increase the sparseness of a storage volume in a virtual machine.

FIG. 7 illustrates data storage system 700 in another embodiment. In FIG. 7, sparse module 502 is within storage system 550. Storage system 550 executes sparse module 502 to increase the sparseness of virtual disk file 525.

In operation, sparse module 502 is executed by storage system 550 to increase the sparseness of the data volume stored in virtual disk file 525, using block bitmap 533 and block mapping table 535. Sparse module 502 creates a new copy of block mapping table 535 and a new copy of virtual disk file 525. Sparse module 502 retrieves block bitmap 533 and, for each block in block mapping table 535, determines if the corresponding block in block bitmap 533 is allocated or unallocated. If the corresponding block is allocated, then the contents in the corresponding block are copied to the new virtual disk file and the new block mapping table for the new virtual disk file is updated accordingly to indicate that the subject block is allocated. If the corresponding block is not allocated, then the new block mapping table is updated accordingly to indicate that the subject block is not allocated. Upon processing each block, the original virtual disk file is replaced with the new virtual disk file. Likewise, the original block mapping table is replaced with the new block mapping table.

Figure 8:
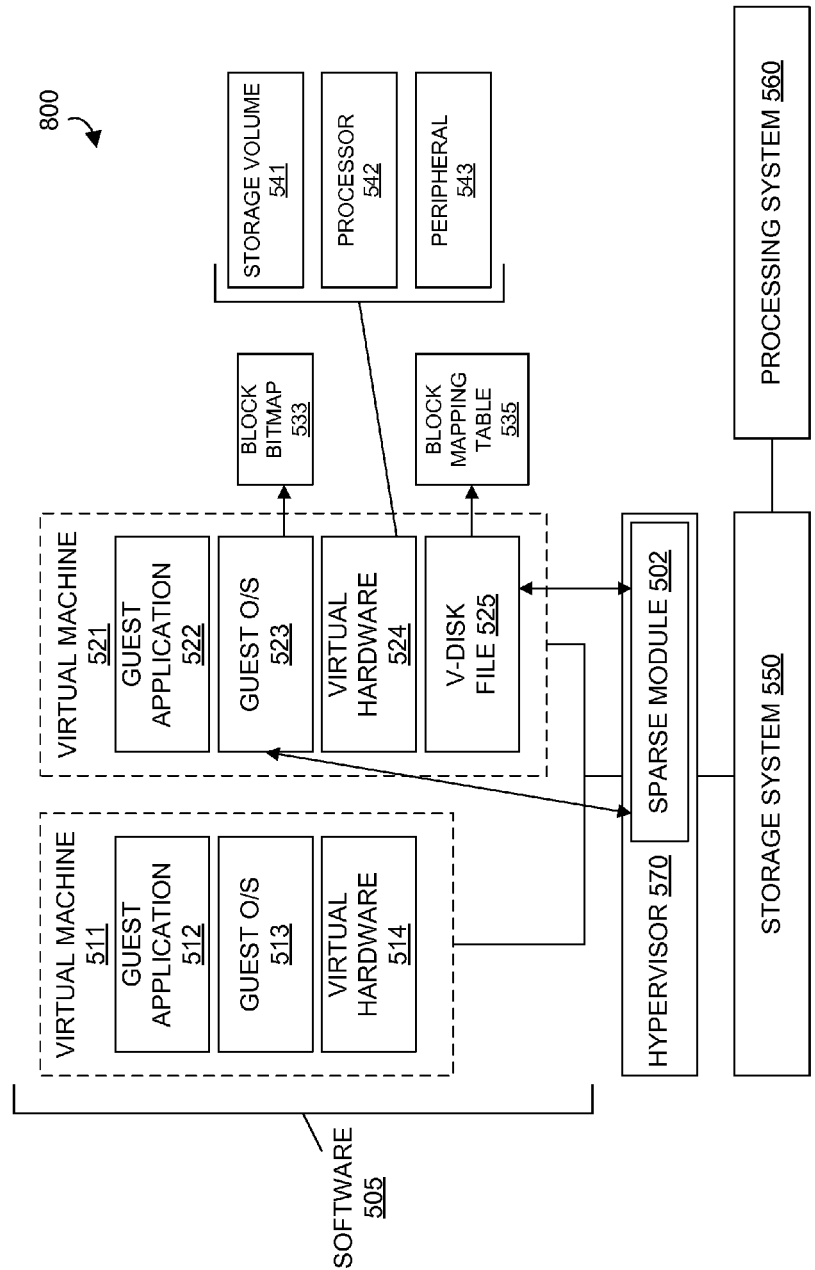
FIG. 8 illustrates a data storage system wherein a sparse module in a hypervisor operates to increase the sparseness of a storage volume in a virtual machine.

FIG. 8 illustrates data storage system 800 in another embodiment. In FIG. 8, data storage system 800 is similar to data storage system 500, and further includes hypervisor 570. Sparse module 502 is executed within hypervisor 570.

In operation, sparse module 502 is executed by processing system 560, within hypervisor 570, to increase the sparseness of the data volume stored in virtual disk file 525, using block bitmap 533 and block mapping table 535. Sparse module 502 creates a new copy of block mapping table 535 and a new copy of virtual disk file 525. Sparse module 502 retrieves block bitmap 533 and, for each block in block mapping table 535, determines if the corresponding block in block bitmap 533 is allocated or unallocated. If the corresponding block is allocated, then the contents in the corresponding block are copied to the new virtual disk file and the new block mapping table for the new virtual disk file is updated accordingly to indicate that the subject block is allocated. If the corresponding block is not allocated, then the new block mapping table is updated accordingly to indicate that the subject block is not allocated. Upon processing each block, the original virtual disk file is replaced with the new virtual disk file. Likewise, the original block mapping table is replaced with the new block mapping table.

Figure 9:
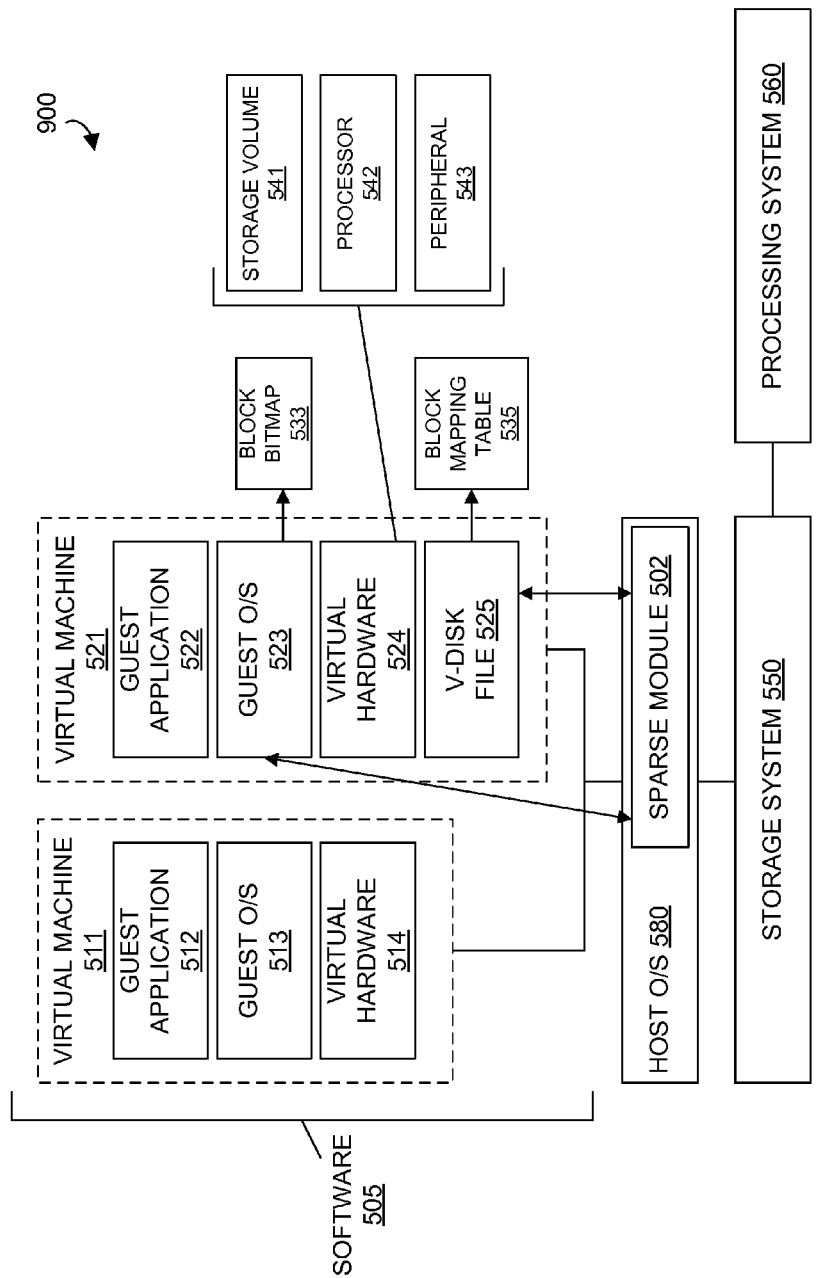
FIG. 9 illustrates a data storage system wherein a sparse module in a host operating system operates to increase the sparseness of a storage volume in a virtual machine.

FIG. 9 illustrates data storage system 900 in another embodiment. In FIG. 9, data storage system 900 is similar to data storage system 500 shown in FIG. 5, and further includes host operating system 580. Sparse module 502 is executed within host operating system 580.

In operation, sparse module 502 is executed by processing system 560, within host operating system 580, to increase the sparseness of the data volume stored in virtual disk file 525, using block bitmap 533 and block mapping table 535. Sparse module 502 creates a new copy of block mapping table 535 and a new copy of virtual disk file 525. Sparse module 502 retrieves block bitmap 533 and, for each block in block mapping table 535, determines if the corresponding block in block bitmap 533 is allocated or unallocated. If the corresponding block is allocated, then the contents in the corresponding block are copied to the new virtual disk file and the new block mapping table for the new virtual disk file is updated accordingly to indicate that the subject block is allocated. If the corresponding block is not allocated, then the new block mapping table is updated accordingly to indicate that the subject block is not allocated. Upon processing each block, the original virtual disk file is replaced with the new virtual disk file. Likewise, the original block mapping table is replaced with the new block mapping table.

Figure 10:
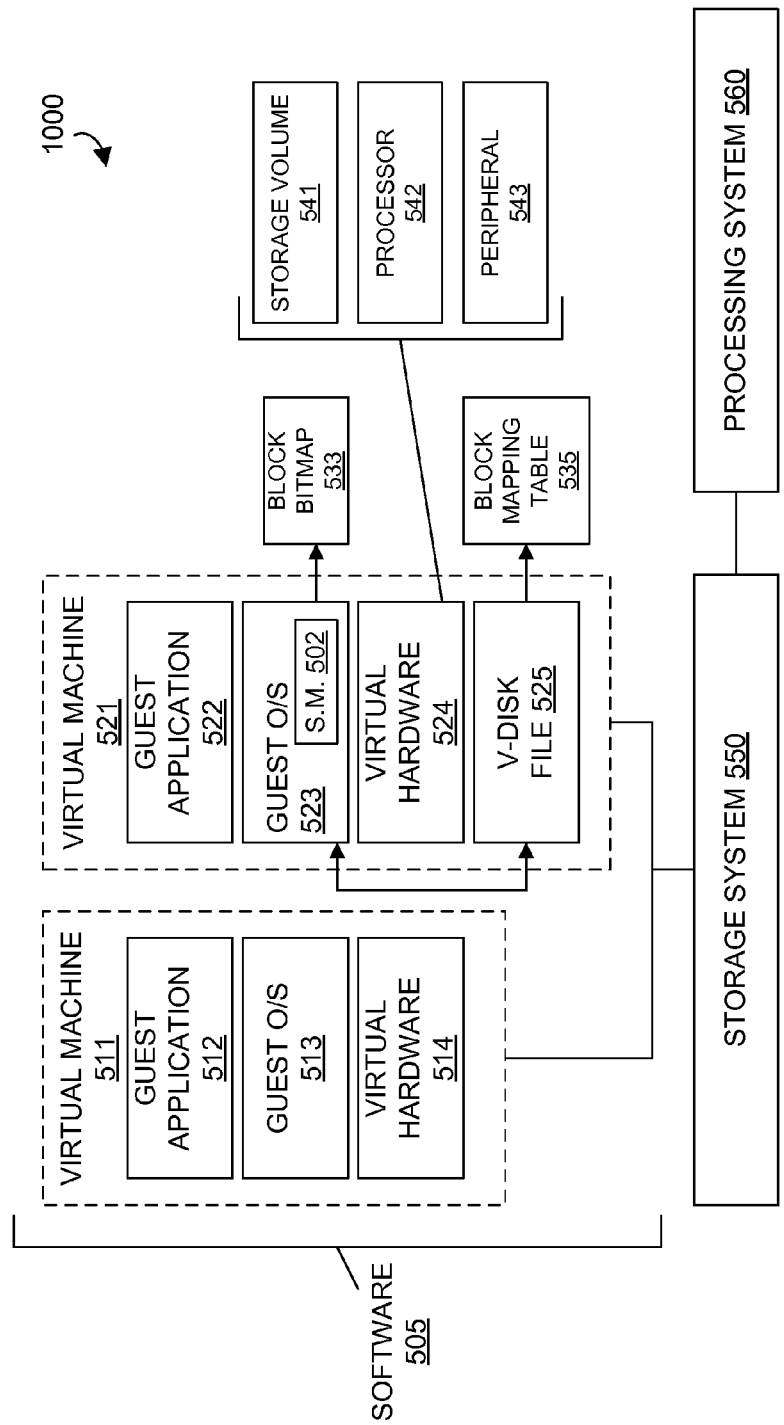
FIG. 10 illustrates a data storage system wherein a sparse module in a virtual machine operates to increase the sparseness of a storage volume in the virtual machine.

FIG. 10 illustrates data storage system 1000 in another embodiment. In FIG. 10, data storage system 1000 is similar to data storage system 500 shown in FIG. 5. However, sparse module 502 is executed within guest operating system 523.

In operation, sparse module 502 is executed by processing system 560, within guest operating system 523, to increase the sparseness of the data volume stored in virtual disk file 525, using block bitmap 533 and block mapping table 535. To begin, sparse module 502 creates a new copy of block mapping table 535 and a new copy of virtual disk file 525. Sparse module 502 retrieves block bitmap 533 and, for each block in block mapping table 535, determines if the corresponding block in block bitmap 533 is allocated or unallocated. If the corresponding block is allocated, then the contents in the corresponding block are copied to the new virtual disk file and the new block mapping table for the new virtual disk file is updated accordingly to indicate that the subject block is allocated. If the corresponding block is not allocated, then the new block mapping table is updated accordingly to indicate that the subject block is not allocated. Upon processing each block, the original virtual disk file is replaced with the new virtual disk file. Likewise, the original block mapping table is replaced with the new block mapping table.

Figure 11:
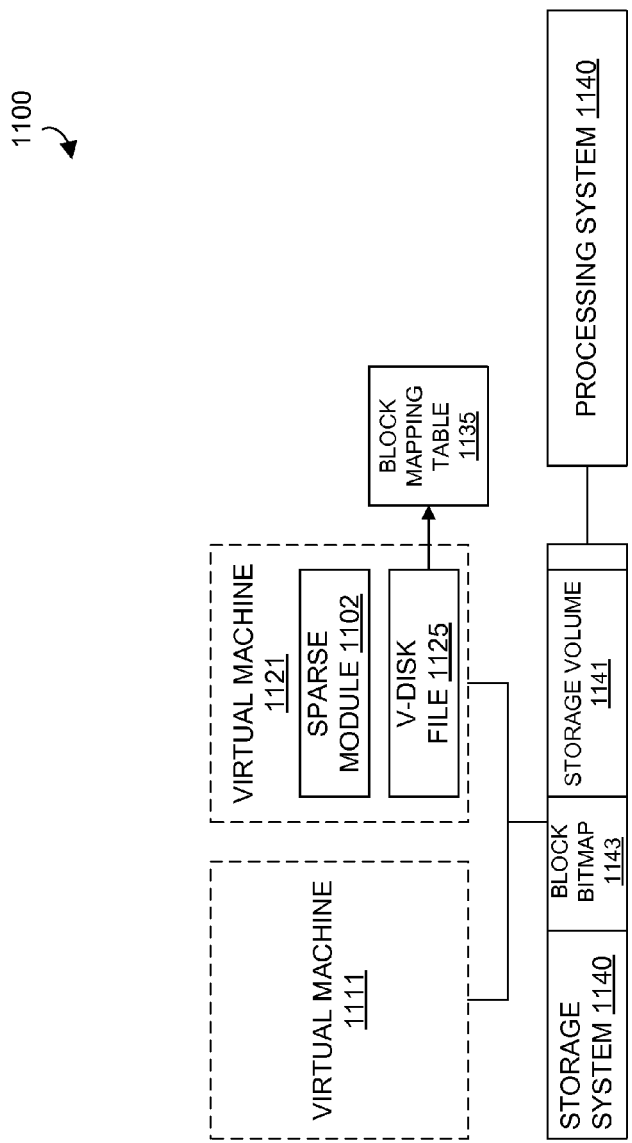
FIG. 11 illustrates a data storage system wherein a sparse module in a virtual machine operates to increase the sparseness of a storage volume in the virtual machine.

FIG. 11 illustrates data storage system 1100 in another embodiment. Data storage system 1100 includes virtual machine 1111, virtual machine 1121, storage system 1140, and processing system 1140. Virtual machine 1121 includes sparse module 1102, virtual disk file 1125, and block mapping table 1135. Storage system 1140 includes storage volume 1141 and block bitmap 1143. Block bitmap 1143 describes the storage of a data volume in storage system 1140. Block mapping table 1135 describes the storage of the data volume in virtual disk file 1125.

In operation, sparse module 1102 is executed by processing system 1140, within virtual machine 1121, to increase the sparseness of the data volume stored in virtual disk file 1125, using block bitmap 1143 and block mapping table 1135.

To begin, sparse module 112 creates a new copy of block mapping table 1135 and a new copy of virtual disk file 1125. Sparse module 1102 retrieves block bitmap 1143 and, for each block in block mapping table 1135, determines if the corresponding block in block bitmap 1143 is allocated or unallocated. If the corresponding block is allocated, then the contents in the corresponding block are copied to the new virtual disk file and the new block mapping table for the new virtual disk file is updated accordingly to indicate that the subject block is allocated. If the corresponding block is not allocated, then the new block mapping table is updated accordingly to indicate that the subject block is not allocated. Upon processing each block, the original virtual disk file is replaced with the new virtual disk file. Likewise, the original block mapping table is replaced with the new block mapping table.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data storage system, the method comprising:
   generating a block bitmap describing storage of a volume of data in a virtual storage device;
   storing the volume of data within a virtual disk file comprising the virtual storage device;
   generating a block mapping table describing storage of the volume of data in the virtual disk file; and
   increasing sparseness of the volume of data stored in the virtual disk file based on the block bitmap and the block mapping table.

2. The method of claim 1 further comprising:
  storing the virtual disk file on a physical storage device; and
  storing the block bitmap in the virtual disk file.

3. The method of claim 2 wherein the data storage system comprises:
  a processing system coupled to the physical storage device;
  a host operating system stored on the physical storage device and executable by the processing system;
  a hypervisor executed by the processing system and configured to provide an interface between the host operating system and a virtual machine, wherein the virtual machine comprises virtual hardware, a guest operating system and a guest application;
  wherein generating the volume of data comprises executing the guest application to generate the volume of data;
  wherein generating the block bitmap comprises executing the guest operating system to generate the block bitmap; and
  wherein generating the block mapping table comprises executing the hypervisor to generate the block mapping table.

4. The method of claim 3, wherein increasing sparseness of the volume of data stored in the virtual disk file based on the block bitmap and the block mapping table comprises:
  in the hypervisor:
    creating a copy of the block mapping table, resulting in a new block mapping table;
    creating a copy of the volume of data from the virtual disk file, resulting in a new virtual disk file, by:
      for each block identified in the block mapping table, if a corresponding block in the block bitmap is allocated, then copying the data in the block to the new virtual disk file and identifying the block as allocated in the new block mapping table, and, if the corresponding block in the block bitmap is not allocated, then identifying the block as unallocated in the new block mapping table;
  in the physical storage device, replacing the virtual disk file with the new virtual disk file; and
  in the hypervisor, replacing the block mapping table with the new block mapping table.

5. The method of claim 1 wherein increasing sparseness of the volume of data stored in the virtual disk file based on the block bitmap and the block mapping table comprises transforming the virtual disk file from a non-sparse state to a sparse state.

6. The method of claim 1 wherein increasing sparseness of the volume of data stored in the virtual disk file based on the block bitmap and the block mapping table comprises transforming the virtual disk file from a sparse state to a more-sparse state relative to the sparseness of the sparse state.

7. A data storage system comprising:
  a processing system configured to:
    generate a block bitmap describing storage of a volume of data in a virtual storage device;
    generate a block mapping table describing storage of the volume of data in a virtual disk file corresponding to the virtual storage device; and
    increase sparseness of the volume of data stored in the virtual disk file based on the block bitmap and the block mapping table; and
  a physical storage device coupled to the processing system and configured to store the virtual disk file, wherein the virtual disk file stores the volume of data.

8. The data storage system of claim 7 wherein the block bitmap is stored in the virtual disk file.

9. The data storage system of claim 8 wherein the data storage system further comprises:
  a host operating system stored on the physical storage device and executable by the processing system;
  a hypervisor executed by the processing system and configured to provide an interface between the host operating system and a virtual machine, wherein the virtual machine comprises virtual hardware, a guest operating system and a guest application;
  wherein the guest application generates the volume of data;
  wherein the guest operating system generates the block bitmap; and
  wherein the hypervisor generates the block mapping table.

10. A non-transitory computer readable medium having program instructions stored thereon for operating a data storage system that, when executed by a processing system, direct the processing system to:
  generate a block bitmap describing storage of a volume of data in a virtual storage device;
  store the volume of data within a virtual disk file comprising the virtual storage device;
  generate a block mapping table describing storage of the volume of data in the virtual disk file; and
  increase sparseness of the volume of data stored in the virtual disk file based on the block bitmap and the block mapping table.

11. The non-transitory computer readable medium of claim 10 wherein the program instructions, when executed by the processing system, direct the processing system to:
  store the virtual disk file on a physical storage device; and
  store the block bitmap in the virtual disk file.

12. The non-transitory computer readable medium of claim 11 wherein the data storage system comprises:
  the processing system coupled to the physical storage device;
  a host operating system stored on the physical storage device and executable by the processing system;
  a hypervisor executed by the processing system and configured to provide an interface between the host operating system and a virtual machine, wherein the virtual machine comprises virtual hardware, a guest operating system and a guest application;
  wherein the program instructions, when executed by the processing system, direct the processing system to:
    execute the guest application to generate the volume of data;
    execute the guest operating system to generate the block bitmap; and
    execute the hypervisor to generate the block mapping table.

13. The non-transitory computer readable medium of claim 12, wherein to increase the sparseness of the volume of data stored in the virtual disk file based on the block bitmap and the block mapping table, the program instructions, when executed by the processing system, direct the processing system to:
  in the hypervisor:
    create a copy of the block mapping table, resulting in new block mapping table;
    create a copy of the volume of data from the virtual disk file, resulting in a new virtual disk file, by:
      for each block identified in the block mapping table, if a corresponding block in the block bitmap is allocated, then copy the data in the block to the new virtual disk file and identify the block as allocated in the new block mapping table, and, if the corresponding block in the block bitmap is not allocated, then identify the block as unallocated in the new block mapping table;

in the physical storage device, replace the virtual disk file with the new virtual disk file; and in the hypervisor, replace the block mapping table with the new block mapping table.

14. The non-transitory computer readable medium of claim 10 wherein, to increase sparseness of the volume of data stored in the virtual disk file based on the block bitmap and the block mapping table, the program instructions direct the processing system to transform the virtual disk file from a non-sparse state to a sparse state.

15. The non-transitory computer readable medium of claim 10 wherein, to increase sparseness of the volume of data stored in the virtual disk file based on the block bitmap and the block mapping table, the program instructions direct the processing system to transform the virtual disk file from a sparse state to a more-sparse state relative to the sparseness of the sparse state.

* * * * *